United States Patent
Yamamoto et al.

(10) Patent No.: US 10,583,413 B2
(45) Date of Patent: Mar. 10, 2020

(54) REACTOR

(71) Applicant: IHI CORPORATION, Tokyo (JP)

(72) Inventors: Taiga Yamamoto, Tokyo (JP); Shigeki Sakakura, Tokyo (JP); Akihisa Yano, Tokyo (JP); Takahito Akita, Tokyo (JP); Shunji Miyajima, Tokyo (JP); Tatsuya Oka, Tokyo (JP); Hideshi Shibuya, Tokyo (JP); Yusuke Takeuchi, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/391,445

(22) Filed: Apr. 23, 2019

(65) Prior Publication Data
US 2019/0247819 A1 Aug. 15, 2019

Related U.S. Application Data

(63) Continuation of application No. PCT/JP2017/043579, filed on Dec. 5, 2017.

(30) Foreign Application Priority Data

Dec. 8, 2016 (JP) .................................. 2016-238220

(51) Int. Cl.
*B01J 19/24* (2006.01)
*C01B 3/38* (2006.01)
(Continued)

(52) U.S. Cl.
CPC .......... *B01J 19/0013* (2013.01); *B01J 19/24* (2013.01); *B01J 19/248* (2013.01); *F28D 9/00* (2013.01);
(Continued)

(58) Field of Classification Search
CPC .... B01J 19/24; B01J 19/2485; B01J 19/0013; B01J 12/007; C01B 3/38; C01B 3/384
USPC .......................................................... 422/633
See application file for complete search history.

(56) References Cited

U.S. PATENT DOCUMENTS 5,550,279 A     8/1996 Yano
2005/0013738 A1* 1/2005 Schwalbe ............ B01J 19/0033
                                                          422/67
(Continued)

FOREIGN PATENT DOCUMENTS

JP     H06-192182 A    7/1994
JP     2006-523531 A   10/2006
(Continued)

*Primary Examiner* — Huy Tram Nguyen

(57) ABSTRACT

A reactor includes a reaction unit, a first pipe, a second pipe, a composition analysis unit connected to the first pipe, a regulating unit connected to the second pipe so as to regulate a flow rate or the like of a second fluid, a control unit causing the regulating unit to regulate the flow rate or the like of the second fluid in accordance with a composition of a product analyzed by the composition analysis unit so that a temperature of a third fluid is controlled to lead the composition of the product to keep a predetermined reaction rate or yield, and a first temperature measurement unit connected to the first pipe so as to measure the temperature of the third fluid. The control unit acquires the information on the temperature of the third fluid from the first temperature measurement unit.

5 Claims, 5 Drawing Sheets

(51) Int. Cl.
*F28D 9/00* (2006.01)
*B01J 19/00* (2006.01)
*F28F 3/08* (2006.01)
*F28F 27/00* (2006.01)

(52) U.S. Cl.
CPC .............. *F28F 3/08* (2013.01); *F28F 27/00* (2013.01); *B01J 2219/0006* (2013.01); *B01J 2219/00063* (2013.01); *B01J 2219/00076* (2013.01); *B01J 2219/00164* (2013.01); *B01J 2219/00186* (2013.01)

(56) References Cited

U.S. PATENT DOCUMENTS

| | | |
|---|---|---|
| 2005/0158217 A1 | 7/2005 | Olbert et al. |
| 2009/0234629 A1 | 9/2009 | Polinsky |
| 2009/0311150 A1* | 12/2009 | Cho .......................... C01B 3/34 422/600 |
| 2011/0104043 A1 | 5/2011 | Niesz et al. |
| 2014/0259886 A1 | 9/2014 | Budaraju et al. |
| 2016/0144336 A1* | 5/2016 | Hamada .................... C01B 3/38 422/601 |

FOREIGN PATENT DOCUMENTS

| | | | |
|---|---|---|---|
| JP | 2007-054817 A | 3/2007 | |
| JP | 2007-519508 A | 7/2007 | |
| JP | 2011-072937 A | 4/2011 | |
| JP | 2011-522787 A | 8/2011 | |
| JP | 2014-166603 A | 9/2014 | |
| JP | 2016-019935 A | 2/2016 | |
| JP | 2016-040217 A | 3/2016 | |
| WO | WO2015037597 | * 3/2015 | .............. B01J 19/24 |

* cited by examiner

C-C

REACTOR

CROSS REFERENCE TO RELATED APPLICATIONS

This application is a continuation application of International Application No. PCT/JP2017/043579, filed on Dec. 5, 2017, which claims priority to Japanese Patent Application No. 2016-238220, filed on Dec. 8, 2016, the entire contents of which are incorporated by reference herein.

BACKGROUND

1. Technical Field

The present disclosure relates to a heat exchanger-type reactor.

2. Description of the Related Art

Heat exchanger-type reactors are known to heat or cool, using a heat medium, a reaction fluid in a gas or liquid state containing a reaction raw material as a reactant so as to promote a reaction of the reactant. Japanese Translation of PCT International Application Publication No. 2007-519508 (Patent Document 1) discloses, as such a reactor, a plate-type reactor including two thermoplates provided with flow channels through which a heat medium flows and interposing a catalyst bed through which a reaction fluid flows. A reactor of another example is known to include reaction flow channels through which a reaction fluid flows, and heat medium flow channels through which a heat medium flows.

SUMMARY

Some regulating conditions including a temperature of each fluid during reaction treatment are preliminarily determined for the operation of such a reactor. The reactor is provided with various types of measuring devices for recognizing the respective regulating conditions during operation. The operator of the reactor acquires various information from the respective measuring devices at a predetermined timing, and changes a particular operating condition according to the own decision when the operating condition falls outside an allowable range defined in the regulating conditions. For example, when a reaction fluid is a first fluid and a heat medium is a second fluid, the change in the operating condition includes the change in a temperature or a flow rate of the second fluid to be supplied.

However, since the operator cannot constantly monitor values indicated in the respective measuring devices, irregular monitoring prevents the reactor from dealing with the change immediately after the particular operating condition falls outside the allowable range, in other words, prevents continuous well-timed operations. For example, when the operator needs to change the temperature or the flow rate of the second fluid to recover the operating condition falling outside the allowable range defined in the regulating conditions, the operator would have to supply the second fluid excessively if the timing when the operator determines the change in the operating condition delays, as compared with a case in which the operator could handle the change in the operating condition immediately after determining the "timing of deviation", which is the timing when the operating condition falls outside the allowable range defined in the regulating conditions. Namely, the operator would have to supply the excessive amount of the second fluid, even though the operator could save the amount of the second fluid additionally supplied if the timing of determination is appropriate. As a result, a larger amount of fuel for heating, for example, could be unnecessarily consumed.

An object of the present disclosure is to provide a reactor capable of immediately recovering an operating condition falling outside an allowable range of a predetermined condition.

A reactor according to an aspect of the present disclosure utilizes heat exchange between a first fluid as a reaction fluid and a second fluid, the reactor including: a reaction unit including a first flow channel through which the first fluid flows and a second flow channel through which the second fluid flows; a first pipe communicating with the first flow channel so as to allow a third fluid containing a product produced in the reaction unit to flow through; a second pipe through which the second fluid is supplied to the second flow channel; a composition analysis unit connected to the first pipe so as to analyze a composition of the product; a regulating unit connected to the second pipe so as to regulate a flow rate and/or a temperature of the second fluid; a control unit causing the regulating unit to regulate the flow rate and/or the temperature of the second fluid in accordance with the composition of the product analyzed by the composition analysis unit so that a temperature of the third fluid is controlled to lead the composition of the product to keep a predetermined reaction rate or yield; and a first temperature measurement unit connected to the first pipe so as to measure the temperature of the third fluid, wherein the control unit acquires information on the temperature of the third fluid from the first temperature measurement unit.

DESCRIPTION OF THE EMBODIMENTS

Figure 1:
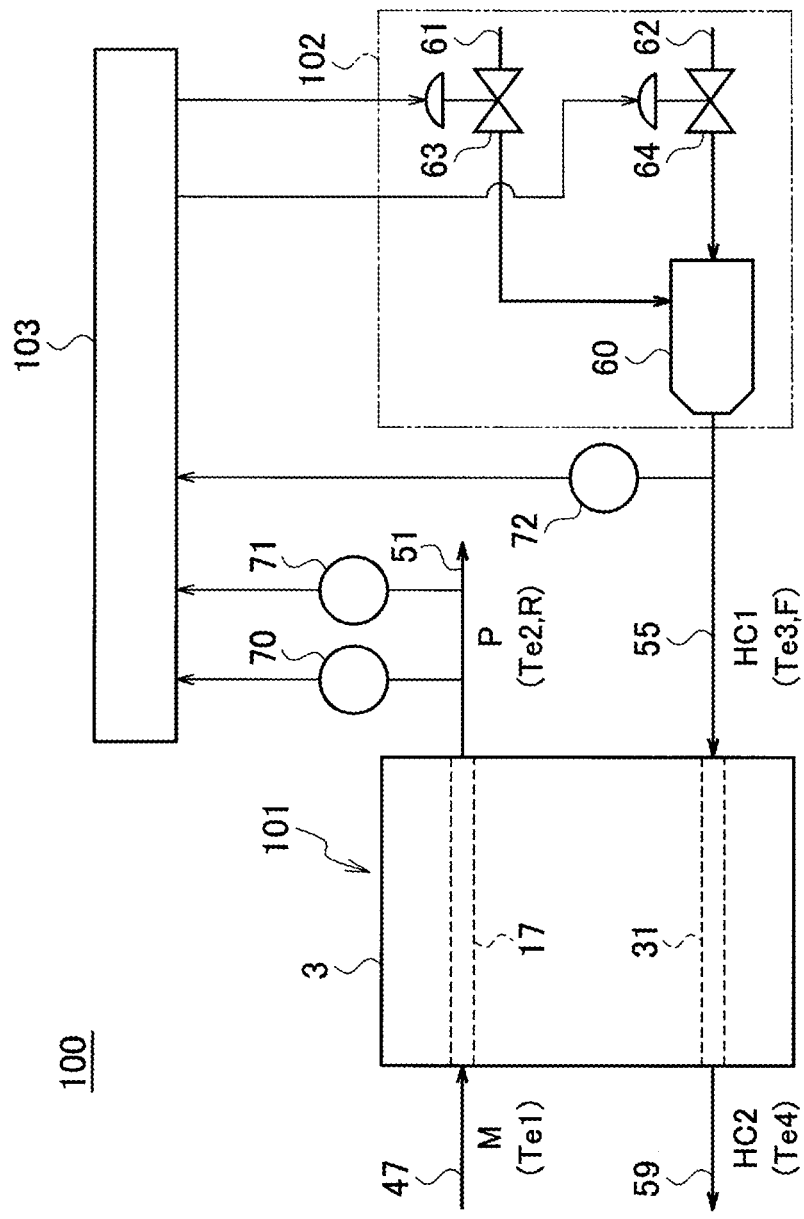
FIG. 1 is a diagram illustrating a structure of a reactor according to an embodiment of the present disclosure.

Embodiments according to the present disclosure will be described in detail below with reference to the drawings. The following dimensions, materials, and specific numerical values described in the embodiments are shown for illustration purposes only, and the present disclosure is not limited thereto unless otherwise specified. The elements having substantially the same functions and structures illustrated in the description and the drawings are designated by the same reference numerals, and overlapping explanations are not repeated below. The elements described below but not related directly to the present disclosure are not shown in the drawings. In the following explanations of the drawings, a vertical direction is defined as a Z-axis, an extending direction of reaction regions in the first and second reaction flow channels described below on a plane perpendicular to the Z-axis is defined as a Y-axis, and a direction perpendicular to the Y-axis is defined as an X-axis.

A reactor according to the present disclosure utilizes heat exchange between a first fluid and a second fluid, and heats or cools a reaction fluid in a gas state or in a liquid state containing a reaction raw material as a reactant so as to promote the reaction of the reactant. According to the present embodiment, the first fluid is presumed to be a reaction fluid, and the second fluid is presumed to be a heat medium, for example. In particular, the reaction fluid supplied to a reaction unit 101 described in detail below is raw material gas M. A third fluid containing a product and discharged from the reaction unit 101 after being subjected to reaction treatment is reaction gas P. The heat medium HC is a heating fluid. In particular, the heating fluid supplied to the reaction unit 101 is heating gas HC1, and the heating fluid emitted from the reaction unit 101 is heating emission gas HC2.

FIG. 1 is a schematic view illustrating a structure of the reactor 100 according to the present embodiment. The reactor 100 includes the reaction unit 101, a first gas supply unit (not shown), and a second gas supply unit 102. The first gas supply unit supplies the raw material gas M to the reaction unit 101. The second gas supply unit 102 supplies the heating gas HC1 to the reaction unit 101.

Figure 2:
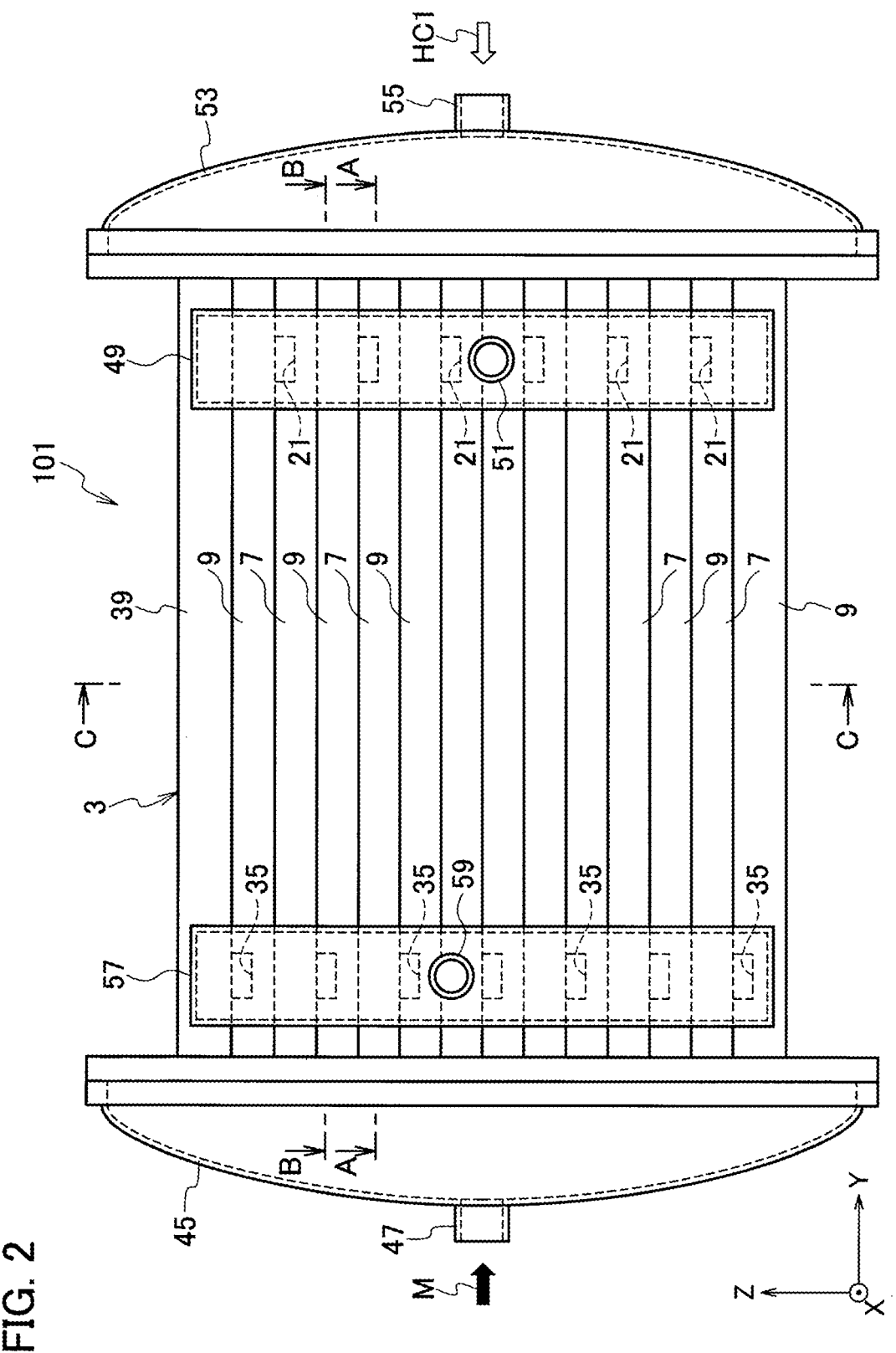
FIG. 2 is a side view illustrating the structure of the reactor.

FIG. 2 is a side view illustrating a structure of the reaction unit 101. The reaction unit 101 executes reaction treatment to produce a product from the raw material gas M. The reaction unit 101 includes a heat exchange unit 3 as a main body.

The heat exchange unit 3 includes a plurality of first heat transfer bodies 7, a plurality of second heat transfer bodies 9, and a lid body 39. The first heat transfer bodies 7 include reaction flow channels through which the reaction fluid flows. The second heat transfer bodies 9 include heat medium flow channels through which the heat medium flows. The heat exchange unit 3 has a counter flow-type structure in which the reaction fluid flows in the direction opposite to the heat medium. The first heat transfer bodies 7, the second heat transfer bodies 9, and the lid body 39 are each a plate-like member made of a heat transfer material having thermal resistance.

Figure 3:
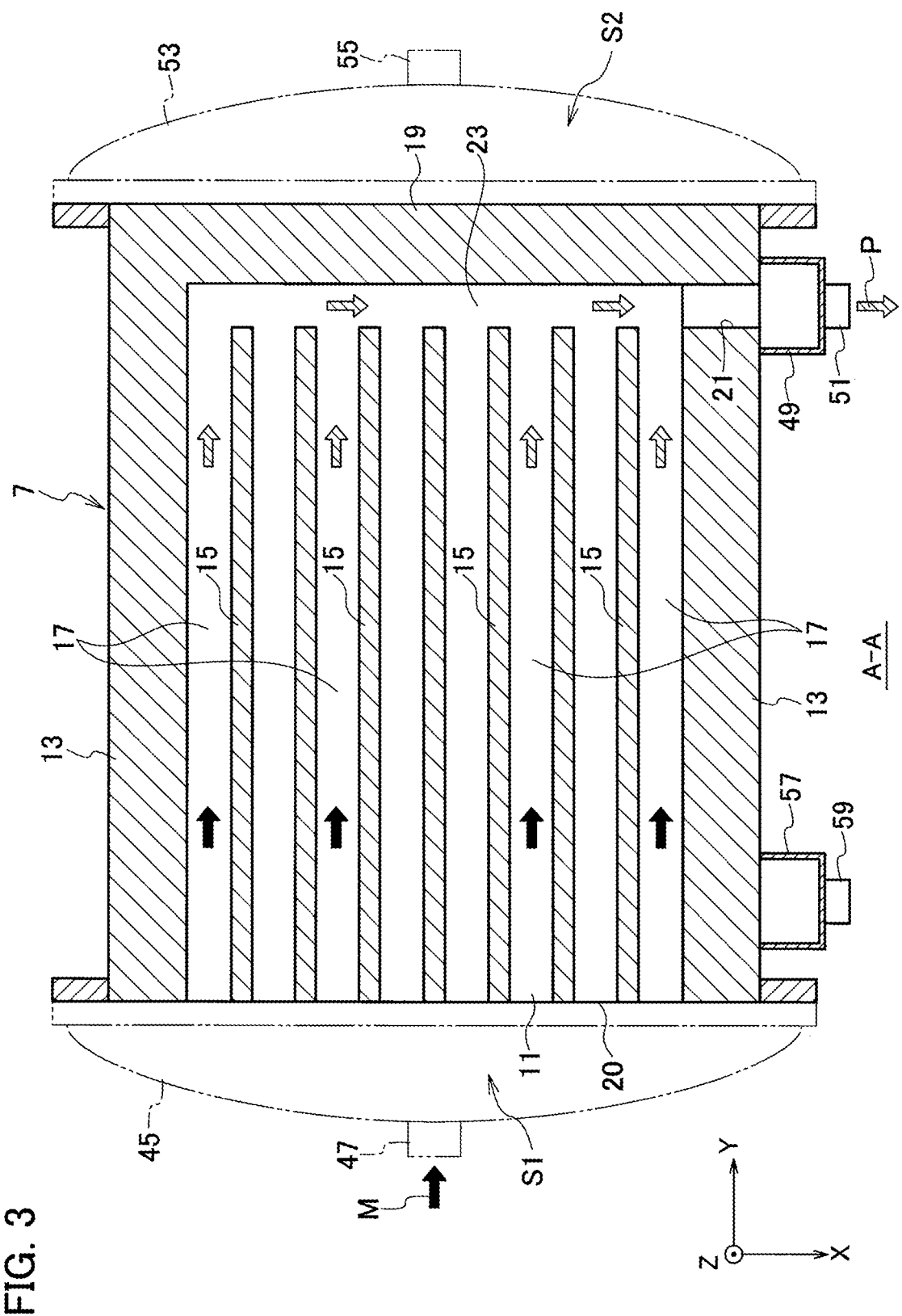
FIG. 3 is a plan view illustrating a structure and a shape of a part including a first heat transfer body in the reactor.

FIG. 3 is a plan view corresponding to a view taken along line A-A in FIG. 2, and showing a structure and a shape of a part including the first heat transfer body 7. Each of the first heat transfer bodies 7 includes a plurality of first flow channels 17 serving as reaction flow channels including reaction regions. The first flow channels 17 include the reaction regions in the middle portions thereof. The first flow channels 17 receive heat supplied from the heat medium flowing through second flow channels in the second heat transfer bodies 9 described below to cause the raw material gas M to react, so as to produce a product. Each of the first flow channels 17 is a groove having a rectangular shape in cross section. In particular, the upper side of the first flow channels 17 in the Z direction is open. Each of the first flow channels 17 has a first side surface open on one side of the respective first heat transfer bodies 7. The first flow channels 17 extend straight from first introduction ports 20 from which the raw material gas M is introduced to a portion immediately in front of a second side surface on the other side of the respective first heat transfer bodies 7 in the Y direction. The first flow channels 17 are arranged at regular intervals in the X direction. FIG. 1 illustrates only one first flow channel 17 in the heat exchange unit 3 included in the reaction unit 101.

The first heat transfer bodies 7 each include a first base 11, two first side walls 13, a plurality of first interposition walls 15, and a first partition wall 19. The first base 11 is a rectangular plate wall portion covering the entire X-Y plane of the respective first heat transfer bodies 7. The first side walls 13 are wall portions provided on both the right and left sides of the extending direction of the first flow channels 17 on one of the main surfaces of the first base 11 perpendicular to the Z direction. The respective interposition walls 15 are wall portions interposed between the two first side walls 13 on one of the main surfaces of the first base 11. The respective interposition walls 15 are arranged at regular intervals parallel to the two first side walls 13. The first partition wall 19 extends in the X direction orthogonal to the extending direction of the first flow channels 17 on the second side surface side on one of the main surfaces of the first base 11. If the first flow channels 17 extend to the second side surface, the first flow channels 17 would reach a second space S2 described below in which the heating gas HC1 is introduced. The provision of the first partition wall 19 changes the flowing direction of the raw material gas M and the product passing through the respective first flow channels 17. The height of each of the first side walls 13, the first interposition walls 15, and the first partition wall 19 in the Z direction is the same.

The first heat transfer bodies 7 each include a first communication flow channel 23 extending along the inner surface of the first partition wall 19. The first communication flow channel 23 communicates with the respective first flow channels 17. The first communication flow channel 23 also communicates at one end with a first discharge port 21 provided at one of the first side walls 13, so as to discharge the product to the outside of the respective first heat transfer bodies 7. Although the first communication flow channel 23 is indicated separately from the first flow channels 17, for illustration purposes, the first communication flow channel 23 and the first flow channels 17 are the same kind of channels having the same function to allow the raw material gas M and the product to flow therethrough with no particular difference. The reaction gas P discharged from the first discharge port 21 contains the product produced in the first flow channels 17. The reaction gas P discharged from the first discharge port 21 may include the raw material gas M not used for the reaction.

Figure 4:
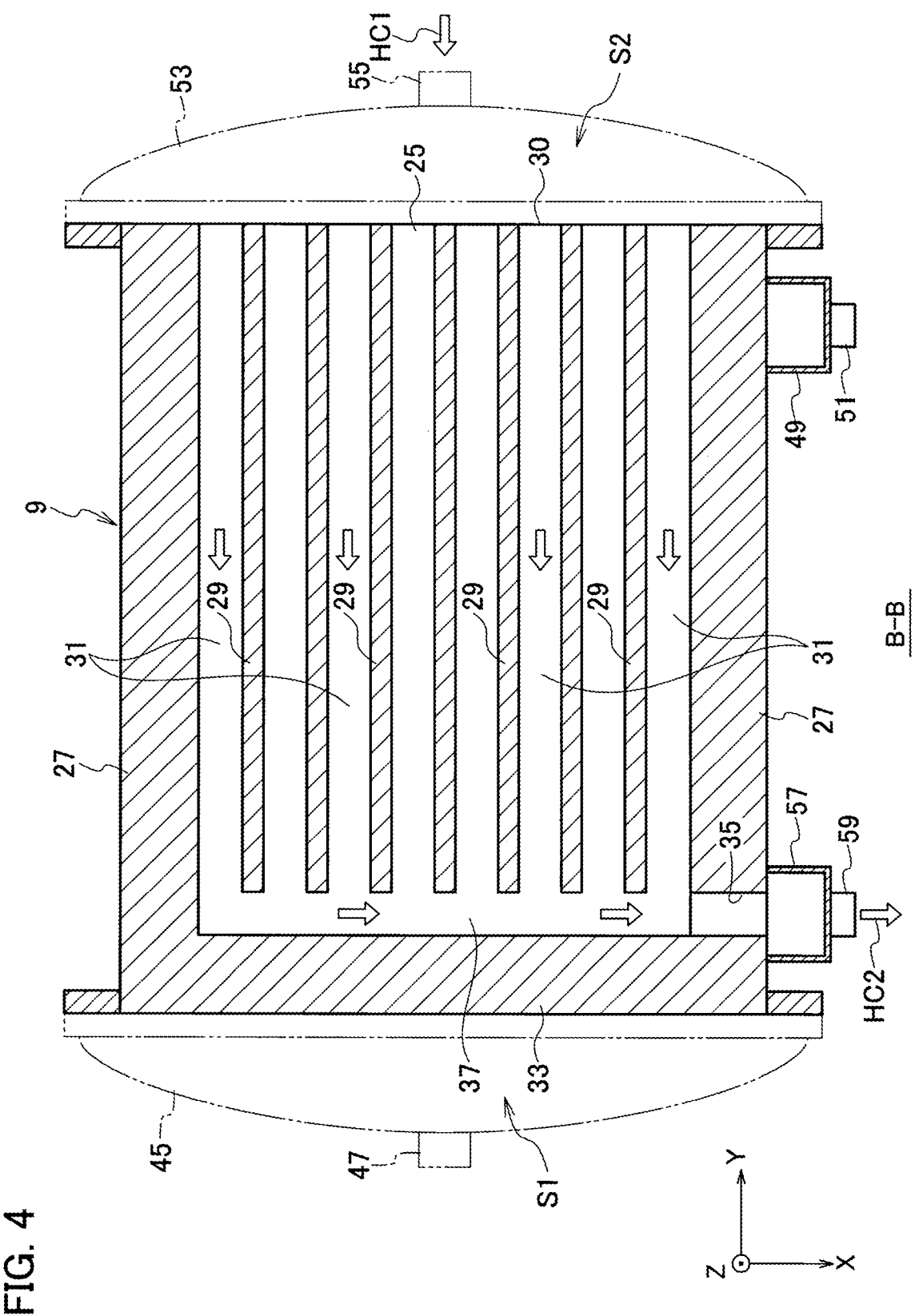
FIG. 4 is a plan view illustrating a structure and a shape of a part including a second heat transfer body in the reactor.

FIG. 4 is a plan view corresponding to a view taken along line B-B in FIG. 2, and showing a structure and a shape of a part including the second heat transfer body 9. Each of the second heat transfer bodies 9 includes a plurality of second flow channels 31 serving as heat medium flow channels. The second flow channels 31 supply heat supplied from the heating gas HC1 to the outside, namely, to the first heat transfer bodies 7. Each of the second flow channels 31 is a groove having a rectangular shape in cross section. In particular, the upper side of the second flow channels 31 in the Z direction is open. Each of the second flow channels 31 has a first side surface open on one side of the respective second heat transfer bodies 9. The second flow channels 31 extend straight from second introduction ports 30 from which the heating gas HC1 is introduced to a portion immediately in front of a second side surface on the other side of the second heat transfer bodies 9 in the Y direction. The first side surface of the respective second heat transfer bodies 9 is located on the opposite side of the first side surface of the respective first heat transfer bodies 7 described above in the Y direction. The second flow channels 31 are arranged at regular intervals in the X direction, as in the case of the first flow channels 17. FIG. 1 illustrates only one second flow channel 31 in the heat exchange unit 3 included in the reaction unit 101.

The second heat transfer bodies 9 each include a second base 25, two second side walls 27, a plurality of second interposition walls 29, and a second partition wall 33. The second base 25 is a rectangular plate wall portion covering the entire X-Y plane of the respective second heat transfer bodies 9. The second side walls 27 are wall portions provided on both the right and left sides of the extending direction of the second flow channels 31 on one of the main surfaces of the second base 25 perpendicular to the Z direction. The respective interposition walls 29 are wall portions interposed between the two second side walls 27 on one of the main surfaces of the second base 25. The respective interposition walls 29 are arranged at regular intervals parallel to the second side walls 27. The second partition wall 33 extends in the X direction orthogonal to the extending direction of the second flow channels 31 on the second side surface side on one of the main surfaces of the second base 25. If the second flow channels 31 extend to the second side surface, the second flow channels 31 would reach a first space S1 described below in which the raw material gas M is introduced. The provision of the second partition wall 33 changes the flowing direction of the heating gas HC1 passing through the respective second flow channels 31. The height of each of the second side walls 27, the second interposition walls 29, and the second partition wall 33 in the Z direction is the same.

The second heat transfer bodies 9 each include a second communication flow channel 37 extending along the inner surface of the second partition wall 33. The second communication flow channel 37 communicates with the respective second flow channels 31. The second communication flow channel 37 also communicates at one end with a second discharge port 35 provided at one of the second side walls 27 so as to discharge the heating emission gas HC2 to the outside of the respective second heat transfer bodies 9.

Figure 5:
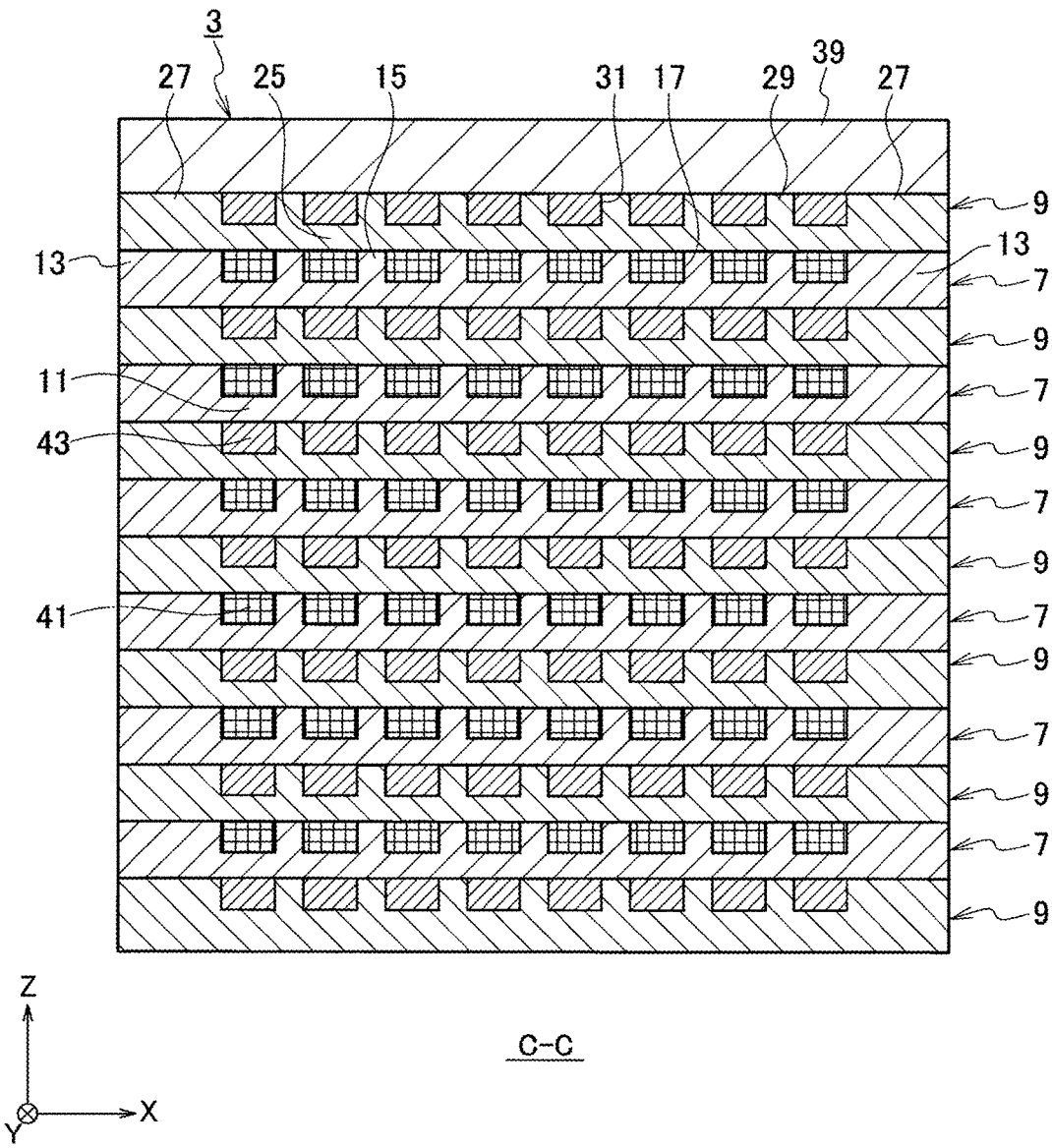
FIG. 5 is a cross-sectional view illustrating a shape and an arrangement of flow channels in the reactor.

FIG. 5 is a cross-sectional view of the heat exchange unit 3, corresponding to a view taken along line C-C in FIG. 2, illustrating the shape and the arrangement of the first flow channels 17 of the first heat transfer bodies 7 and the second flow channels 31 of the second heat transfer bodies 9. The heat exchange unit 3 is fabricated as a connected body or a stacked body such that the lid body 39 is arranged on the uppermost side in the Z direction, and the second heat transfer bodies 9 and the first heat transfer bodies 7 are alternately connected to and stacked with each other below the lid body 39. The first flow channels 17 and the second flow channels 31 are arranged adjacent to each other without contact via the first base 11 or the second base 25. When the heat exchange unit 3 is assembled, the respective members are fixed to each other by a bonding method such as tungsten inert gas (TIG) welding or diffusion bonding, so as to suppress a reduction in heat transfer derived from poor contact between the respective members.

The heat transfer material used for the respective elements included in the heat exchange unit 3 is preferably thermally-resistant metal such as an iron alloy or a nickel alloy. More particularly, the thermally-resistant alloy may be an iron alloy such as stainless steel, or a nickel alloy such as Inconel alloy 625 (registered trademark), Inconel alloy 617 (registered trademark), and Haynes alloy 230 (registered trademark). These preferable heat transfer materials have durability or corrosion resistance with respect to the fluid which can be used for promoting the reaction in the first flow channels 17 or used as a heat medium. However, the present embodiment is not limited to these materials. Alternatively, the heat transfer material may be iron-based plated steel, metal covered with thermally-resistant resin such as fluororesin, or carbon graphite.

Although the heat exchange unit 3 may be composed of at least a pair of one first heat transfer body 7 and one second heat transfer body 9, a larger number of the respective heat transfer bodies, as illustrated in the respective drawings, are preferably provided so as to improve the heat exchange performance. The number of the first flow channels 17 provided in each first heat transfer body 7 and the number of the second flow channels 31 provided in each second heat transfer body 9 may be determined as appropriate and may be changed in view of the designing conditions or heat transfer efficiency of the heat exchange unit 3. The heat exchange unit 3 may be covered with or surrounded by a housing or a heat insulator so as to suppress heat radiation to avoid heat loss.

The first flow channels 17 may be provided with catalyst bodies 41 for promoting the reaction. A catalyst included in the catalyst bodies 41 is selected as appropriate from substances mainly containing active metal effective in promotion of a chemical reaction, and suitable for the promotion of the reaction based on a synthesis reaction induced in the reaction unit 101. Examples of active metal as a catalytic component include nickel (Ni), cobalt (Co), iron (Fe), platinum (Pt), ruthenium (Ru), rhodium (Rh), and palladium (Pd). These metals may be used singly, or any combination of these metals that is effective in the promotion of the reaction may be used. The catalyst bodies 41 are prepared such that the catalyst is supported on a structure material, for example. The structure material is selected as appropriate from thermally-resistant metals which can be molded and support the catalyst. The structure, used as the catalyst bodies 41, may have a corrugated plate-like shape in a wave-like state or a shape in a sharply roughened state in cross section so as to increase the contact area with the reaction fluid. Examples of such thermally-resistant metals include iron (Fe), chromium (Cr), aluminum (Al), yttrium (Y), cobalt (Co), nickel (Ni), magnesium (Mg), titanium (Ti), molybdenum (Mo), tungsten (W), niobium (Nb), tantalum (Ta), and a thermally-resistant alloy mainly containing one of or some of these metals. The catalyst bodies 41 may be obtained such that a thin plate structure made of a thermally-resistant alloy such as Fecralloy (registered trademark) is molded. The catalyst may be supported directly on the structure material by surface modification or the like, or may be supported indirectly on the structure material via a carrier. Practically, the use of the carrier facilitates the process of supporting the catalyst. The carrier is selected as appropriate from materials having durability without impeding the promotion of the reaction and is capable of supporting the catalyst effectively, in view of the reaction induced in the reaction unit 101. The carrier may be a metal oxide such as alumina ($Al_2O_3$), titania ($TiO_2$), zirconia ($ZrO_2$), ceria ($CeO_2$), or silica ($SiO_2$). These metal oxides may be used singly, or some of these metal oxides may be selected and combined together. Examples of supporting methods using the carrier include a process of forming a mixed layer of the catalyst and the carrier on the surface of the structure material molded, and a process of forming a carrier layer and then supporting the catalyst on the carrier layer by surface modification or the like.

The second flow channels 31 may be provided with heat transfer promoters 43 for increasing the contact area with the heat medium to promote the heat transfer between the heat medium and the respective second heat transfer bodies 9. The heat transfer promoters 43 may have a corrugated plate-like shape in order to ensure the contact area with the respective second heat transfer bodies 9. A heat transfer material used for the heat transfer promoters 43 may be metal such as aluminum, copper, stainless steel, and iron-based plated steel.

The reaction unit 101 further includes a reaction fluid introduction part 45 and a product discharge part 49, and a heat medium introduction part 53 and a heat medium discharge part 57.

The reaction fluid introduction part 45 is a casing curved concavely. The reaction fluid introduction part 45 covers the side surface of the heat exchange unit 3 on the side on which the first introduction ports 20 of the first flow channels 17 are open to define the first space S1 together with the heat exchange unit 3. The reaction fluid introduction part 45 is detachable or openable with respect to the heat exchange unit 3. The detachable or openable reaction fluid introduction part 45 allows the operator to insert or remove the catalyst bodies 41 into or from the first flow channels 17, for example. The reaction fluid introduction part 45 includes a first introduction pipe 47 through which the raw material gas M is introduced from the first gas supply unit (not shown). The first introduction pipe 47 is located in the middle on the side surface of the heat exchange unit 3, in particular, located in the middle on the X-Z plane, and is connected to the reaction fluid introduction part 45 in the same direction as the open direction of the respective first introduction ports 20. Such a structure can distribute the raw material gas M introduced from one portion to the respective first introduction ports 20.

The product discharge part 49 is a box-shaped casing with one surface open. The product discharge part 49 is arranged on a third side surface of the heat exchange unit 3 such that the open surface faces the respective first discharge ports 21 of the first heat transfer bodies 7. The product discharge part 49 includes a first discharge pipe 51 at a part of the wall portion thereof for discharging the reaction gas P containing the product to the outside of the reaction unit 101. The first discharge pipe 51 is connected to another external treatment device (not shown) for executing aftertreatment of the reaction gas P. The reaction gas P discharged from the respective first discharge ports 21 is thus recovered through the single first discharge pipe 51.

The heat medium introduction part 53 is a casing curved concavely, as in the case of the reaction fluid introduction part 45. The heat medium introduction part 53 covers the side surface of the heat exchange unit 3 on the side on which the second introduction ports 30 of the second flow channels 31 are open to define the second space S2 together with the heat exchange unit 3. The heat medium introduction part 53 is detachable or openable with respect to the heat exchange unit 3. The detachable or openable heat medium introduction part 53 allows the operator to insert or remove the heat transfer promoters 43 into or from the second flow channels 31, for example. The heat medium introduction part 53 includes a second introduction pipe 55 through which the heating gas HC1 is introduced from the second gas supply unit 102. The second introduction pipe 55 is located in the middle on the side surface of the heat exchange unit 3, in particular, located in the middle on the X-Z plane, and is connected to the heat medium introduction part 53 in the same direction as the open direction of the respective second introduction ports 30. Such a structure can distribute the heating gas HC1 introduced from one portion to the respective second introduction ports 30.

The heat medium discharge part 57 is a box-shaped casing with one surface open, as in the case of the product discharge part 49. The heat medium discharge part 57 is arranged on the third side surface of the heat exchange unit 3 such that the open surface faces the respective second discharge ports 35 of the second heat transfer bodies 9. The heat medium discharge part 57 includes a second discharge pipe 59 at a part of the wall portion thereof for discharging the heating emission gas HC2 to the outside of the reaction unit 101. The second discharge pipe 59 is connected to another external treatment device (not shown) for reusing the heating emission gas HC2. The heating emission gas HC2 discharged from the respective second discharge ports 35 is thus recovered through the single second discharge pipe 59.

The heat exchange body 3 may be any of a liquid-liquid heat exchanger, a gas-gas heat exchanger, and a gas-liquid heat exchanger, and the reaction fluid and the heat medium supplied to the reaction unit 101 may be either gas or liquid. The reaction unit 101 can cause chemical synthesis through various kinds of thermal reactions such as an endothermic reaction and an exothermic reaction. Examples of such thermal reactions causing synthesis include: a steam reforming reaction of methane as represented by the following chemical equation (1); an endothermic reaction such as a dry reforming reaction of methane as represented by the following chemical equation (2); a shift reaction as represented by the following chemical equation (3); a methanation reaction as represented by the following chemical equation (4); and a Fischer-Tropsch synthesis reaction as represented by the following chemical equation (5). The reaction fluid used in these reactions is in a gas state.

$$CH_4 + H_2O \rightarrow 3H_2 + CO \qquad (1)$$

$$CH_4 + CO_2 \rightarrow 2H_2 + 2CO \qquad (2)$$

$$CO + H_2O \rightarrow CO_2 + H_2 \qquad (3)$$

$$CO + 3H_2 \rightarrow CH_4 + H_2O \qquad (4)$$

$$(2n+1)H_2 + nCO \rightarrow C_nH_{2n+2} + nH_2O \qquad (5)$$

The heat medium is preferably a substance not corroding the constituent materials of the reaction unit 101, and may be a gaseous substance such as combustion gas or heating air in the case of the heating gas according to the present embodiment. Alternatively, the heat medium may be a liquid substance such as water or oil. The gaseous substance used as the heat medium is easier to handle than the liquid medium.

The first gas supply unit (not shown) as a constituent element of the reactor 100 is connected to the first introduction pipe 47 to supply the raw material gas M toward the respective first flow channels 17 in the reaction unit 101. Hereinafter, a temperature of the raw material gas M passing through the first introduction pipe 47 before being introduced to the reaction unit 101 is indicated by "Te1".

The second gas supply unit 102 is connected to the second introduction pipe 55 to supply the heating gas HC1 toward the respective second flow channels 31 in the reaction unit 101. The heating gas HC1 is combustion gas, for example. In this case, the second gas supply unit 102 includes a combustor 60 for producing combustion gas, a fuel supply pipe 61 through which fuel is supplied to the combustor 60, and an air supply pipe 62 through which air is supplied to the combustor 60. The second gas supply unit 102 further includes a first electromagnetic valve 63 capable of regulating a flow rate of the fuel flowing through the pipe. The first electromagnetic valve 63 is arranged in the fuel supply pipe 61. The second gas supply unit 102 also includes a second electromagnetic valve 64 capable of regulating a flow rate of the air flowing through the pipe. The second electromagnetic valve 64 is arranged in the air supply pipe 62. Hereinafter, a temperature of the heating gas HC1 passing through the second introduction pipe 55 before being introduced to the reaction unit 101 is indicated by "Te3", and the corresponding flow rate is indicated by "F". According to the present embodiment, the combustor 60, the first electromagnetic valve 63, and the second electromagnetic valve 64 collectively serve as a regulating unit for regulating the temperature Te3 of the heating gas HC1. In particular, the flow rate of the fuel varies depending on the aperture of the first electromagnetic valve 63, and the flow rate of the air varies depending on the aperture of the second electromagnetic valve 64, so as to change the ratio of flow between the fuel and the air. As the ratio of flow changes, the temperature Te3 of the heating gas HC1 emitted from the combustor 60 changes.

The reactor 100 also includes a first temperature measurement unit 70 for measuring a temperature of the reaction gas P flowing through the pipe, and a composition analysis unit 71 for analyzing a composition of the reaction gas P. The first temperature measurement unit 70 and the composition analysis unit 71 are arranged in the first discharge pipe 51. Hereinafter, the temperature of the reaction gas P measured by the first temperature measurement unit 70 is indicated by "Te2", and the corresponding reaction rate is indicated by "R".

The composition analysis unit 71 is a gas chromatograph, for example. The gas chromatograph is an analysis instrument that identifies and quantitates compounds by chromatography. The gas chromatograph can be used when a stationary phase and a mobile phase are both gas, and is thus preferably used for analyzing the composition of the product contained in the reaction gas P in the present embodiment.

The reactor 100 also includes a second temperature measurement unit 72 for measuring the temperature of the heating gas HC1 flowing through the pipe. The second temperature measurement unit 72 is arranged in the second introduction pipe 55. The heating emission gas HC2 discharged from the reaction unit 101 flows through the second discharge pipe 59. Hereinafter, the temperature of the heating emission gas HC2 is indicated by "Te4".

The reactor 100 further includes a control unit 103 for controlling the entire operation of the reactor 100. The control unit 103 according to the present embodiment is in particular electrically connected to the first temperature measurement unit 70, the second temperature measurement unit 72, and the composition analysis unit 71. The control unit 103 is also electrically connected to the first electromagnetic valve 63 and the second electromagnetic valve 64. As used herein, the phrase "electrically connected" refers to either wired connection or wireless connection. The control unit 103 can regulate the flow rate or the temperature of the heating gas HC1 particularly in accordance with the composition of the product contained in the reaction gas P analyzed by the composition analysis unit 71.

Next, the operations according to the present embodiment are described below.

Some regulating conditions including the temperatures of the respective fluids during the reaction treatment are preliminarily determined for the operation of the reactor 100. For example, the reactor 100 is presumed to execute the reaction treatment as represented by the chemical equation (1) using gas containing methane and steam as the raw material gas M. In this case, the temperature Te3 of the heating gas HC1 may be set to 850° C., and the corresponding flow rate F may be set to 10,000 Nm³/h. When the reaction treatment is executed in the reaction unit 101 under such conditions, the temperature Te4 of the heating emission gas HC2 is decreased to 600° C., while the temperature Te2 of the reaction gas P containing the product is increased to 830° C. The temperature Te3 of the heating gas HC1 during the reaction treatment is thus set to the temperature slightly higher than the temperature Te2 of the reaction gas P. The reaction rate R of the reaction gas P is then led to about 95%. This is a normal operating state in the reactor 100.

As used herein, the term "reaction rate R" refers to the amount of the raw material contained in the reaction gas P as a product with respect to the amount of the raw material contained in the raw material gas M, namely, refers to the amount of the raw material actually used in the reaction for producing the product. The reaction rate R targeted for reducing waste of the raw material gas M to efficiently produce the product is typically and preferably as high as possible. The present embodiment sets the reaction rate R to 95%, as described above. The reaction rate R varies depending on the type of the reaction. The reaction rate R is thus determined as appropriate while taking account of a yield calculated on the basis of selectivity of a plurality of reactions when the reactions are executed simultaneously, for example.

However, the reaction rate R as one of the operating conditions could be decreased more than presumed for some reason when the reactor 100 is operated continuously under the predetermined regulating conditions. The reason for this may be that the catalyst bodies 41 placed in the first flow channels 17 or the heat transfer promoters 43 placed in the second flow channels 31 in the reaction unit 101 are degraded with the passage of time. In such a case, the temperatures Te1 and Te3 and the flow rate F as the regulating conditions as initially set do not change. However, the temperature Te4 of the heating emission gas HC2 stops decreasing at 605° C. before reaching the initial temperature of 600° C. While the temperature Te2 of the reaction gas P does not change to remain the same, the reaction rate R is decreased to 92%, for example, which falls outside the allowable range. Such an unfavorable state definitely means that more waste of the raw material gas M is caused than presumed.

According to the present embodiment, the control unit 103 controls as follows in view of the change in the reaction rate R. First, the operator stores the target reaction rate R set to 95% in the control unit 103. Next, the control unit 103 causes the composition analysis unit 71 to analyze the composition of the product contained in the reaction gas P constantly during the reaction treatment, and determines whether the reaction rate R is kept at 95% according to the analysis result, namely, on the basis of the composition of the product. If, for example, the control unit 103 determines that the reaction rate R is decreased to 92% as described above, the control unit 103 controls the aperture of the first electromagnetic valve 63 or the second electromagnetic valve 64 as appropriate at the timing when the reaction rate R is determined to be decreased to 92% to regulate the temperature Te3 of the heating gas HC1 so as to keep the reaction rate R at 95% as initially set. Hereinafter, the timing when the reaction rate R falls outside the allowable range is referred to as the "timing of deviation".

This operation increases the temperature Te3 of the heating gas HC1 to 870° C. from the initial temperature of 850° C., for example. The corresponding flow rate F is also increased to 10,500 Nm³/h from the initial flow rate of 10,000 Nm³/h. The temperature Te4 of the heating emission gas HC2 is kept at 605° C. Accordingly, the temperature Te2 of the reaction gas P is increased to 850° C. from the initial temperature of 830° C., and the reaction rate R recovers to the preliminarily set rate of 95%, without the temperature Te1 of the raw material gas M changed. The control unit 103 particularly determines the timing of deviation in accordance with the composition analysis of the product detected constantly, so as to recover the reaction rate R immediately after the timing of deviation.

The control unit 103 can constantly acquire the information on the temperature Te2 of the reaction gas P from the first temperature measurement unit 70. The control unit 103 thus can refer to the change in the temperature Te2, in addition to the change in the reaction rate R, in determining the timing of deviation. Accordingly, the accuracy in determining the timing of deviation is improved.

The control unit 103 can also constantly acquire the information on the temperature Te3 of the heating gas HC1 from the second temperature measurement unit 72. The control unit 103 thus can determine whether the temperature Te3 is regulated so as to allow the predetermined reaction rate R to be maintained when the first electromagnetic valve 63 or the second electromagnetic valve 64 is operated to regulate the temperature Te3. Accordingly, the reliability in recovering the reaction rate R is improved.

The advantageous effects according to the present embodiment are described below.

The reactor 100 which utilizes the heat exchange between the first fluid as a reaction fluid and the second fluid, includes the reaction unit 101 including the first flow channels 17 through which the first fluid flows and the second flow channels 31 through which the second fluid flows, the first pipe communicating with the first flow channels 17 so as to allow the third fluid containing the product produced in the reaction unit 101 to flow through, the second pipe through which the second fluid is supplied to the respective second flow channels 31, the composition analysis unit 71 connected to the first pipe so as to analyze the composition of the product, the regulating unit connected to the second pipe so as to regulate the flow rate and/or the temperature of the second fluid, and the control unit 103 causing the regulating unit to regulate the flow rate F and/or the temperature Te3 of the second fluid in accordance with the composition of the product analyzed by the composition analysis unit 71 so that the temperature Te2 of the third fluid is controlled to lead the composition of the product to keep the predetermined reaction rate R or yield.

According to the present embodiment, the first fluid corresponds to the raw material gas M, the second fluid corresponds to the heating gas HC1, and the third fluid corresponds to the reaction gas P. According to the present embodiment, the first pipe corresponds to the first discharge pipe 51, and the second pipe corresponds to the second introduction pipe 55. The regulating unit according to the present embodiment serves as the combustor 60, the first electromagnetic valve 63, and the second electromagnetic valve 64.

The control unit 103 constantly monitors the composition of the product contained in the reaction gas P analyzed by the composition analysis unit 71, and immediately determines the timing of deviation in accordance with the change in the composition. When the timing of deviation is determined, the control unit 103 causes the regulating unit to regulate the temperature Te3 of the heating gas HC1 as appropriate, so as to immediately recover the reaction rate R. The reactor 100 according to the present embodiment thus can immediately recover the operating conditions if the operating conditions fall outside the allowable ranges of the conditions preliminarily determined. Accordingly, the reactor 100 can minimize the waste of the raw material gas M, for example.

The reactor 100 according to the present embodiment may include the first temperature measurement unit 70 connected to the first pipe so as to measure the temperature Te2 of the third fluid. The control unit 103 acquires the information on the temperature Te2 of the third fluid from the first temperature measurement unit 70.

The reactor 100 according to the present embodiment thus can determine, by the control unit 103, the timing of deviation by referring to not only the change in the reaction rate R but also the change in the temperature Te2. Accordingly, the accuracy in determining the timing of deviation is improved, leading to the improvement in the promptness in recovering the reaction rate R.

The reactor 100 according to the present embodiment may include the second temperature measurement unit 72 connected to the second pipe so as to measure the temperature of the second fluid. The control unit 103 determines whether the regulating unit regulates the temperature Te3 of the second fluid so as to keep the predetermined reaction rate R or yield, by referring to the temperature Te3 of the second fluid measured by the second temperature measurement unit 72.

The reactor 100 according to the present embodiment can determine, by the control unit 103, whether the temperature Te3 is regulated to be a preferred temperature when the first electromagnetic valve 63 or the like is operated upon the regulation of the temperature Te3, so as to further improve the reliability in recovering the reaction rate R.

The reactor 100 according to the present embodiment may include, in the reaction unit 101, the heat exchange unit 3 including the heat transfer bodies. The first flow channels 17 and the second flow channels 31 may be grooves or penetration holes provided in the respective heat transfer bodies.

The heat exchange unit 3 according to the present embodiment includes two kinds of heat transfer bodies alternately stacked, including the first heat transfer bodies 7 provided with the first flow channels 17 through which the first fluid flows and the second heat transfer bodies 9 provided with the second flow channels 31 through which the second fluid flows. The respective flow channels in the heat transfer bodies described above are preferably grooves in view of the facilitation of manufacture.

The present disclosure is not limited to the heat exchange unit 3 including the heat transfer bodies having the above configuration. For example, the present disclosure may be applicable to a case in which the heat exchange unit 3 includes a single cuboidal heat transfer body provided with both of the first flow channels through which the first fluid flows and the second flow channels through which the second fluid flows. The respective flow channels in this case are penetration holes.

The reactor 100 according to the present embodiment can achieve the effects described above particularly when the heat exchange unit 3 included in the reaction unit 101 includes either a single cuboidal heat transfer body or a plurality of heat transfer bodies directly stacked on one another to be integrated together.

The reactor 100 according to the present embodiment may use the heat medium as the second fluid.

The reactor 100 according to the present embodiment can achieve the effects described above particularly when the reaction treatment uses the reaction fluid as the first fluid and the heat medium as the second fluid.

The reactor 100 according to the present embodiment may also use the reaction fluid as the second fluid.

Some of the conventional reactors relevant to the present disclosure use the reaction fluid not only as the first fluid but also as the second fluid. The reactor 100 according to the present embodiment may also be used as a reactor executing the reaction treatment in which both the first fluid and the second fluid are the reaction fluid, so as to achieve substantially the same effects described above.

Other Embodiments

The above embodiment has been illustrated with the case in which the second fluid, of which the temperature or the flow rate is regulated by the regulating unit, is the heating gas HC1 that is combustion gas. When the combustion gas is used as the heating gas HC1, the regulating unit only needs to regulate the flow rates of the fuel and the air as appropriate to change the ratio of flow therebetween, so as to change the temperature of the heating gas HC1 accordingly.

The heating gas as the second fluid may be vapor. The regulating unit then may be a heater capable of regulating a preheating temperature, for example, regardless of whether the regulating unit directly produces vapor or not. Alternatively, the regulating unit may be an electromagnetic valve capable of regulating the flow rate of vapor produced, instead of the heating device for producing vapor. This can also be applicable to a case in which the second fluid is liquid such as heating oil.

The reactor 100 according to the present disclosure can be used not only for the reaction treatment through the endothermic reaction as illustrated above but also for reaction treatment through an exothermic reaction. The second fluid thus may be a cooling fluid, instead of the heating fluid. For example, the regulating unit using cooling water as the second fluid may be an electromagnetic valve for regulating the flow rate of the water, for example. Alternatively, the regulating unit using a refrigerant as the second fluid may be a cooler capable of regulating the temperature of the refrigerant, or an electromagnetic valve for regulating the flow rate of the refrigerant, for example.

The above embodiment has been illustrated with the gas chromatograph used as the composition analysis unit 71 for analyzing the composition of the reaction gas P. The composition analysis unit 71 is not limited to the gas chromatograph, and may be a gas analyzer for particular gas, such as an oxygen analyzer or a methane analyzer, so as to analyze the concentration of each gas contained in the reaction gas.

The above embodiment has been illustrated with the stacked reactor 100 in which the respective first heat transfer bodies 7 and the respective second heat transfer bodies 9 are alternately stacked on one another. The present disclosure may also be applied to a plate-type reactor in which a catalyst bed through which the reaction fluid as the first fluid flows is interposed between two thermoplates provided with flow channels through which the heat medium as the second fluid flows, for example.

The above embodiment has been illustrated with the case in which the heat exchange unit 3 has a counter flow-type structure in which the first fluid flows in the first flow channels 17 in the direction opposite to the flowing direction of the second fluid flowing in the second flow channels 31, but the heat exchange unit 3 may have a parallel flow-type structure in which the respective fluids flow in the same direction. The present disclosure thus can be applicable to any case in which the first fluid and the second fluid flow in either direction.

The above embodiment has been illustrated with the case in which the first heat transfer bodies 7 and the second heat transfer bodies 9 composing the heat exchange unit 3 are alternately stacked on one another in the Z direction which is the vertical direction, but the present disclosure is not limited to this case. For example, several sets of the respective heat transfer bodies composing the heat exchange unit 3 and transversely connected to each other may be stacked in the Z direction.

It should be understood that the present disclosure includes various embodiments which are not disclosed herein. Therefore, the scope of the present disclosure is defined only by the matters according to the claims reasonably derived from the description above.

What is claimed is:

1. A reactor utilizing heat exchange between a first fluid as a reaction fluid and a second fluid, the reactor comprising:
   a reaction unit including a first flow channel through which the first fluid flows and a second flow channel through which the second fluid flows;
   a first pipe communicating with the first flow channel so as to allow a third fluid containing a product produced in the reaction unit to flow through;
   a second pipe through which the second fluid is supplied to the second flow channel;
   a composition analysis unit connected to the first pipe so as to analyze a composition of the product;
   a regulating unit connected to the second pipe so as to regulate a flow rate and/or a temperature of the second fluid;
   a control unit causing the regulating unit to regulate the flow rate and/or the temperature of the second fluid in accordance with the composition of the product analyzed by the composition analysis unit so that a temperature of the third fluid is controlled to lead the composition of the product to keep a predetermined reaction rate or yield; and
   a first temperature measurement unit connected to the first pipe so as to measure the temperature of the third fluid,
   wherein the control unit acquires information on the temperature of the third fluid from the first temperature measurement unit.

2. The reactor according to claim 1, further comprising a second temperature measurement unit connected to the second pipe so as to measure the temperature of the second fluid,
   wherein the control unit determines whether the regulating unit regulates the temperature of the second fluid so as to keep the predetermined reaction rate or yield by referring to the temperature of the second fluid measured by the second temperature measurement unit.

3. The reactor according to claim 1, wherein:
   the reaction unit includes a heat exchange unit including a heat exchange body; and
   the first flow channel and the second flow channel are grooves or penetration holes provided in the heat exchange body.

4. The reactor according to claim 1, wherein the second fluid is a heat medium.

5. The reactor according to claim 1, wherein the second fluid is a reaction fluid.

* * * * *